United States Patent [19]
Tomitaka

[11] Patent Number: 5,430,809
[45] Date of Patent: Jul. 4, 1995

[54] HUMAN FACE TRACKING SYSTEM
[75] Inventor: Tadafusa Tomitaka, Tokyo, Japan
[73] Assignee: Sony Corporation, Tokyo, Japan
[21] Appl. No.: 86,868
[22] Filed: Jul. 7, 1993
[30] Foreign Application Priority Data Jul. 10, 1992 [JP]  Japan ................. 4-207107

[51] Int. Cl.6 .................. G06K 9/34; G06K 9/46; G06K 9/20
[52] U.S. Cl. .................. 382/173; 382/115; 382/191; 382/291; 348/169; 348/77
[58] Field of Search .............. 382/17, 2, 1, 9, 28, 382/18, 48; 348/169, 172, 77

[56] References Cited

U.S. PATENT DOCUMENTS

| | | | |
|---|---|---|---|
| 4,975,969 | 12/1990 | Tal | 382/2 |
| 4,991,223 | 2/1991 | Bradley | 382/17 |
| 5,093,869 | 3/1992 | Alves et al. | 382/22 |
| 5,103,484 | 4/1992 | Stafford et al. | 382/1 |
| 5,187,574 | 2/1993 | Kosemura et al. | 348/169 |
| 5,280,530 | 1/1994 | Trew et al. | 382/1 |
| 5,293,255 | 3/1994 | Nishizawa et al. | 358/453 |

FOREIGN PATENT DOCUMENTS

| | | | |
|---|---|---|---|
| 439334 | 7/1991 | European Pat. Off. | H04N 7/18 |

OTHER PUBLICATIONS

Fukuda et al, "Recognition of Human Faces Using Fuzzy Inference" IEEE Int'l Workshop on Robots and Human Commun, (Apr. 1992).
Akamatusu, "Accurate and Robust Face ID" IEEE (1992).
Shimada, "Extraction of Scenes Containing a Specific Person . . . ", IEEE Region 10 Conf. (Nov. 1992).
Patent Abstracts of Japan, vol. 17, No. 2190 corres. to Japanese Patent Publication JP4354490 (Ando).
Patent Abstracts of Japan, vol. 10, No. 127 corres. to Japanese Ptaent Publication JP60253887 (Touyama).

Primary Examiner—Leo H. Boudreau
Assistant Examiner—Michael R. Cammarata
Attorney, Agent, or Firm—Jay H. Maioli

[57] ABSTRACT

A video camera system with autonomous target tracking sets a measuring frame on an object with high accuracy using a hue signal and a brightness signal without being affected by intensity and direction of the light source. A display screen is divided into divided areas and for each divided area, a lightness divided area in which the values of the brightness signal are within prescribed ranges of luminance and a skin color divided area in which the values of the hue signal are within prescribed ranges corresponding to skin color are extracted. Based on the extraction result, the position of the object on the screen determined and the measuring frame is set without being affected by intensity and direction of the light source. Thereafter, the object is continuously centered within the measuring frame.

9 Claims, 8 Drawing Sheets

HUMAN FACE TRACKING SYSTEM

BACKGROUND OF THE INVENTION

1. Field of the Invention

This invention relates to a video camera system and is suitably applied to the automonous target tracking apparatus in which the field of view of a video camera can track the center of the object, such as a human face model.

2. Description of the Related Art

Heretofore, for an autonomous target tracking apparatus of a video camera, a first automonous target tracking method which memorizes the peak value of high frequency element of brightness signal in the measuring frame and automatically tracks its movement as the feature of the target has been proposed.

Moreover, a second automonous target tracking method, regarding brightness signals of the front and back fields in the measuring frame, whereby a motion vector is formed by taking the key point matching and assuming that the motion vector in the measuring frame represents the movement of the target, has been proposed.

The first automonous tracking method has an advantage that the general construction is simple, but for example, in the case where there is a background tree with a man in the measuring frame, the man cannot be tracked automatically since high frequency element of the tree is the biggest peak at this point.

Furthermore, because basically the first automonous tracking method basically utilizes peak signals, it is easily affected by noise and as a result, there is a possibility that automatic tracking cannot be performed in the photographic environment with low brightness. Also, it is possible that the object with poor contrast cannot automatically be tracked because a high frequency element cannot be extracted.

Furthermore, according to the second automonous tracking method, it is difficult to distinguish whether the calculated motion vector is caused by unintentional movement of hands of video camera or the movement of the object, and in practice there is a possibility that it functions erroneously.

SUMMARY OF THE INVENTION

In view of the foregoing, an object of this invention is to provide an automonous tracking apparatus of video camera which is hard to be affected by the intensity and direction of the light source and, simultaneously, which is hard to be affected by the background.

The foregoing object and other objects of the invention have been achieved by the provision of a video camera system with the following elements. An area divider (16, SP1) divides a display screen PIC displaying an image representing a picture output signal S1 outputted from a lens block unit 1 into divided areas AR of the prescribed numbers 32×32, 16×16. A skin color divided area extractor (16, SP1) extracts skin color divided areas ARB in areas AR wherein values of hue signal HUE is representative of a skin color A lightness area extractor (16, SP1) extracts lightness divided area ARA in areas AR wherein brightness signal Y has the prescribed lightness. An absorber (16, SP2) forms skin divided area groups FC1, FC2 and lightness divided area groups HR1, HR2 by absorbing blank areas around the skin divided areas ARB and lightness divided areas ARA. An adjacent divided area group extractor (16, SP5) extracts a set of adjacent skin divided area group FC1 and lightness divided area group HR1 in skin divided area groups FC1, FC2 and lightness divided area groups HR1, HR2, respectively. A measuring frame locator (16, SP9) sets a measuring frame PIC in order that the set of the skin divided area group FC1 and the lightness divided area group HR1 are included in the measuring frame PIC.

When blank areas AR around the skin divided area ARB and the lightness divided area ARA are absorbed, even though there occurs blank areas in the skin divided area ARB and the lightness divided area ARA caused by the intensity and/or direction of the light source, the skin divided area and the lightness divided area can be extracted properly because they are absorbed in skin divided area groups FC1, FC2 and lightness divided area groups HR1, HR2, respectively. Simultaneously the measuring frame for the object can be set with certainty because the measuring frame is set based on the adjacent set FC1, HR1 in the skin divided area groups FC1, FC2 and the lightness divided area groups HR1, HR2, respectively.

According to the present invention, because image information of each pixel which constitutes the display screen is divided into the prescribed number of small divided areas and the measuring frame is set by judging the position and size of the skin color area based on a value of the hue signal of each small divided area, the video camera system which is capable of setting the measuring frame on the object at a high accuracy can be easily obtained.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
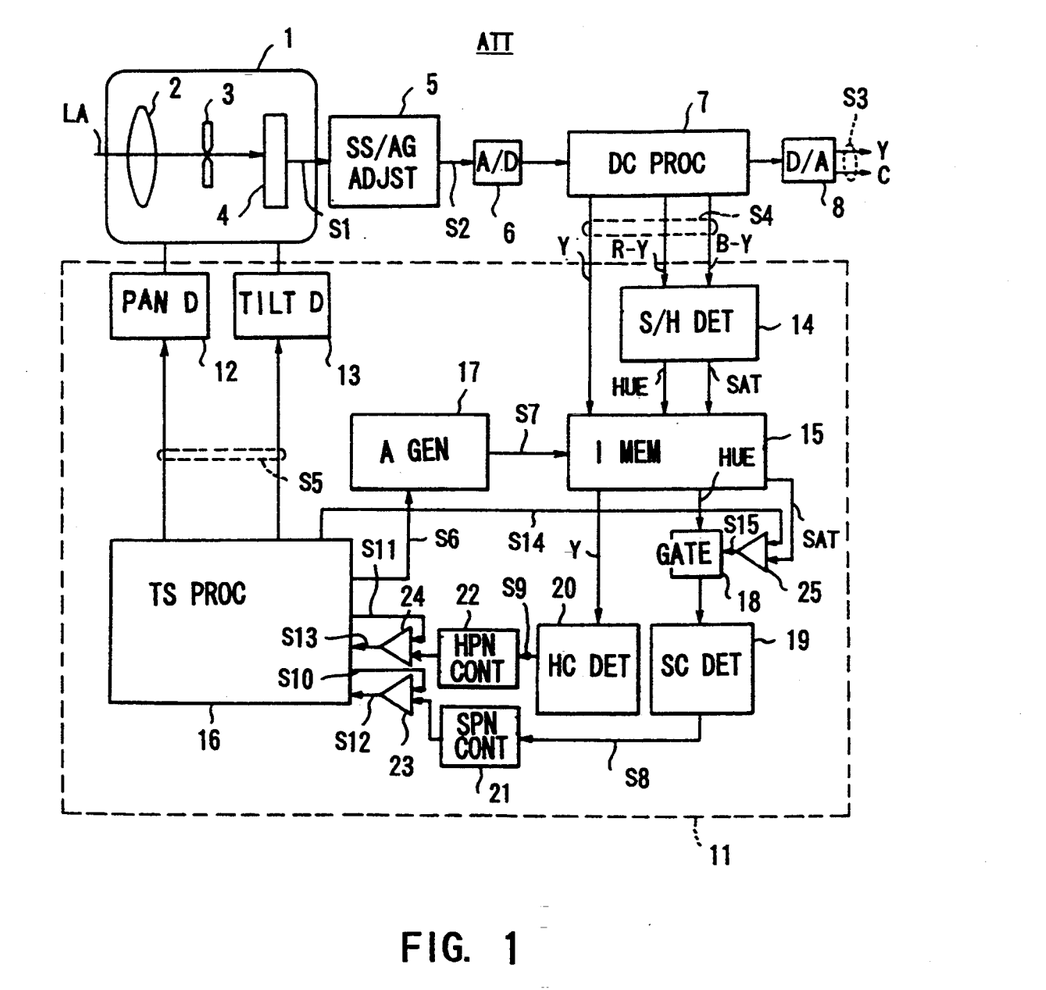
FIG. 1 is a block diagram showing the construction of video camera automonous target tracking apparatus applicable to the video camera system.

Preferred embodiments of this invention will be described with reference to the accompanying drawings:

In FIG. 1, ATT generally shows an autonomous target tracking apparatus of the video camera system, and the autonomous target tracker aims at a human face as its target. Thus, it is applicable as a means to make a lens block of the video camera system constituting the Autonomous Target Tracker with Human Recognition, ATT-HR system for automatically tracking function.

The autonomous target tracking apparatus ATT receives an image light LA which comes from the human face model as the object at a charge coupled device 4 (CCD) through a lens 2 of the lens block unit 1 and an iris 3 and delivers an image output signal S1 which shows the target image to a signal separation/automatic gain adjusting circuit 5.

The signal separation/automatic gain adjusting circuit sample holds the image output signal S1, which is gain controlled in order to have the prescribed gain by the control signal from an auto iris (AE) system (not shown) and thus obtained image output signal S2 will be supplied to a digital camera processing circuit 7 through an analog-to-digital converter 6.

The digital camera processing circuit 7 forms brightness signal Y, chrominance signal C and color difference signals R-Y and B-Y according to the image output signal S2, and outputs the brightness signal Y and chrominance signal C through a digital-to-analog converter 8 as video signal S3.

Furthermore, the digital camera processing circuit 7 supplies brightness signal Y and color difference signals R-Y and B-Y as target tracking detection signal S4 to a tracking control circuit 11, which generates tracking control signal S5 for a panning driving motor 12 and a tilting driving motor 13 which are equipped in the lens block unit 1 in accordance with the target tracking detection signal S4.

First of all, the tracking control circuit unit 11 supplies color difference signals R-Y and B-Y to a saturation/hue detection circuit 14 and forms the hue signal HUE and the saturation signal SAT and memorizes these with brightness signal Y in an image memory 15 constituted by, such as field memory, per picture element unit.

The saturation/hue detection circuit 14 forms hue signal HUE and saturation signal SAT by converting form rectangular coordinate to polar coordinate the color difference signals R-Y and B-Y, and recognizes the human face model as an object based on the visual stimulation which human beings can perceive by means of brightness signal Y, hue signal HUE and saturation signal SAT.

Figure 2:
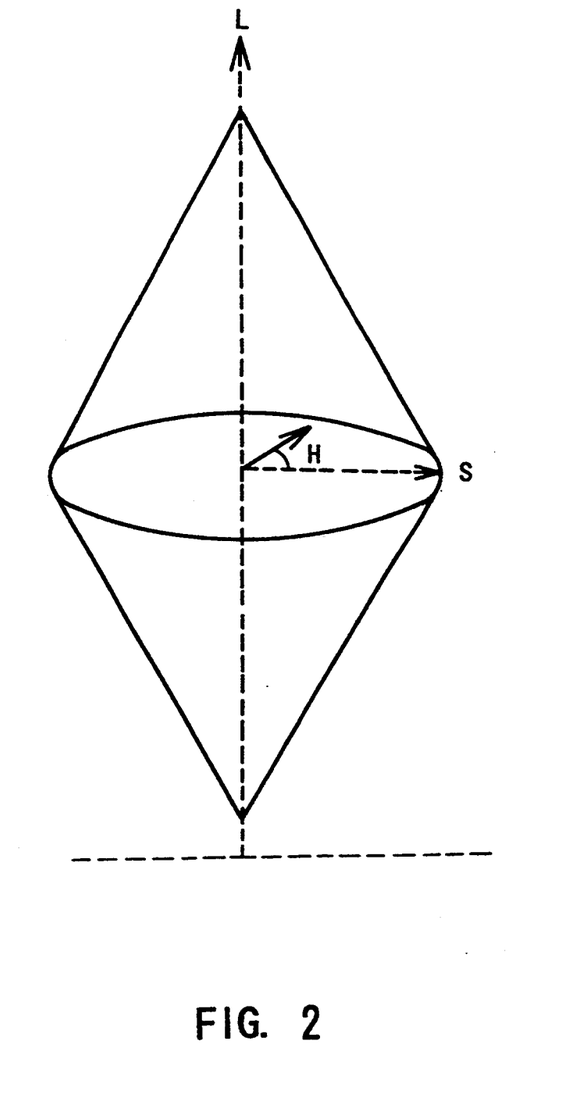
FIG. 2 is a schematic diagram illustrating a HLS color coordinate system which expresses the visual stimulation.

In this connection, as shown in FIG. 2, the visual stimulation which human beings can generally perceive, can be expressed in L axis and color coordinate system which contains SH plane perpendicularly intersecting to L axis also known as "HLS system". L axis shows "lightness" and this is equivalent to brightness signal Y. SH plane is expressed by polar coordinate which intersects perpendicularly L axis. In the SH plane, S shows "saturation" and is expressed by the distance from L axis. Also, H stands for "hue" and hue is expressed by an angle at the time when the direction of hue signal B-Y is 0 [°].

The cubic factor of this HLS is represented that, as the light source becomes lighter, the color coordinate, i.e., SH plane, moves upward along the L axis, and all colors become white. At this point, the saturation S gradually decreases. On the other hand, if the light source becomes darker, the color coordinate, i.e., SH plane, falls down along the L axis, and all colors become black. At this point, the saturation S also decreases.

As described above, the saturation S and the brightness Y are easily affected by the lightness of the light source in accordance with the characteristic of HLS color coordinate system; and therefore, it is difficult to say that they are the optimal parameters to express the quantity of features of the object. On the other hand, it is obvious that the hue H is the quantity which is not easily affected by the light source as a parameter to express the quantity of inherent features of the object.

However, in the case where color of the object is in the neighborhood of L axis, i.e., in the case of white, black or gray, the signal of hue H has no meaning. In the worst case, in spite of the fact that the picture with poor S/N is white, it is possible to have various hue H vectors.

In utilizing these features of HLS color coordinate system, the tracking control circuit 11 extracts the feature of the human face model as the object and when the feature changes, the panning driving motor 12 and tilting driving motor 13 will be actuated in order to follow the changes and as a result, video signal which tracks the movement of the object as video signal S3 will be obtained.

Figure 3:
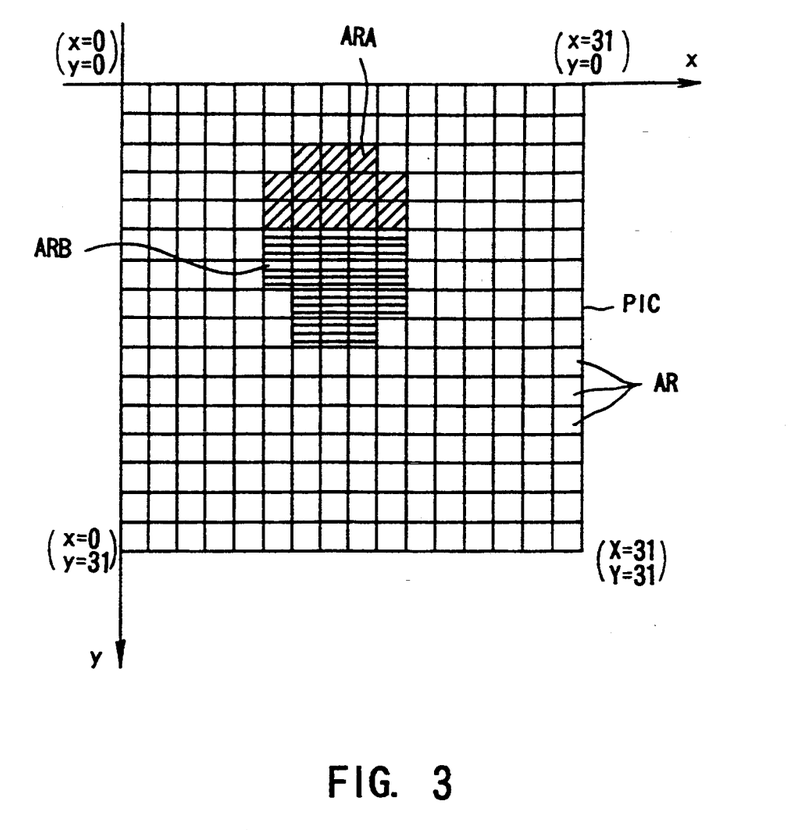
FIG. 3 is a schematic diagram showing a display screen PIC wherein the image information can be obtained by dividing into small areas.

More specifically, target tracking detection signal S4 memorized in an image memory 15 is supplied with address signal S7 to divide the display screen PIC formed in the image memory 15 into divided areas AR of the prescribed size in accordance with xy rectangular coordinates (x, y), as shown in FIG. 3, by giving block defining signal S6 outputted by the microprocessor composed tracking signal processing circuit 16 to an address generation circuit 17.

Thus, the data of each picture element which constitute the display screen PIC of the image memory 15 will be read out in every divided area AR and will be evaluated as an image information in each divided area AR.

In the case of this embodiment, the display screen PIC is divided into 32 (or 16) small divided areas AR in the directions of x and y respectively, and thus by designating the coordinates of rectangular coordinate (x, y) as x=i, y=j, regarding 32×32 (or 16×16) small divided areas AR, the image information I (x=i, y=j) of small divided areas to be designated can be read out.

With this arrangement, whereas the hue signal HUE element will be given to a skin color detection circuit 19 through a gate circuit 18 in the image information I (x=i, y=j) to be read out in every small divided area from the image memory 15, the brightness signal Y element will be given directly to a hair color detection circuit 20.

The skin color detection circuit 19 detects the image part of skin of the human face model and when the incoming hue signal HUE element is within the prescribed ranges of skin color, it gives "+1" count output S8 to a skin color pixel number counter 21 as the image of said picture element is skin color.

In practice, the dynamic range of hue signal HUE takes the value in the range of an angle 0°–350°.

On the other hand, the hair color detection circuit 20 detects hair color areas in the image part of the human face model and in the case of this embodiment, the dynamic range of brightness signal Y is expressed by the value 0–255 (8 bits) and when the brightness signal of each picture element is below the value 50, it defines as black and judges that said picture element exists in the hair area and outputs "+1" count output S9 to a hair pixel number counter 22.

With this arrangement, the number of pixels having information on skin color and hair color respectively in pixels contained in each divided area AR, will be counted in the skin color pixel number counter 21 and the hair pixel number counter 22.

The counting result of each divided area AR of the skin color pixel number counter 21 and the hair pixel number counter 22 will be compared with judgement reference signals S10 and S11 supplied by the tracking signal processing circuit 16 to comparators 23 and 24.

At this point, judgement reference signals S10 and S11 are set to the respective values for determining whether the counting result of skin color pixel number counter 21 and hair pixel number counter 22 are consistent with a prospective skin color area or prospective hair area or not for said divided areas AR, and thus, comparators 23 and 24 transmit prospective skin color area detection information S12 and prospective hair area detection information S13 to the tracking signal processing circuit 16.

In the case of this embodiment, a hue noise gate signal forming circuit 25 composed of comparator is equipped for the gate circuit 18 and it compares saturation signal SAT to be read out for every pixel from the image memory 15 with noise judgement signal S14 outputted from tracking signal processing circuit 16, and by giving gate signal S15 which operates the gate circuit to close when saturation signal SAT is under the prescribed level, it is so arranged that the hue signal HUE element of said pixel will not be inputted to the skin color detection circuit 19.

In this connection, in the case where the hue signal HUE detected at the saturation/hue detection circuit 14 is in the neighborhood of the L axis (FIG. 2) and this means that said hue signal HUE has small saturation and for fear that it is buried in noises and has no meanings as information, these meaningless hue signals will be eliminated at the gate circuit 18.

According to the foregoing construction, the tracking signal processing circuit 16 judges the feature of an image on the display screen PIC from the prospective skin color area detection information S12 and the prospective hair area detection information S13 obtained based on brightness signal Y, hue signal HUE and saturation signal SAT of each pixel contained in the image memory 15 and delivers tracking control signal S5 whereby the center of gravity of human face model can be positioned in the center of the measuring frame constantly, to the panning driving motor 12 and the tilting driving motor 13.

In the case of this embodiment, supposing that the display screen PIC is generally one measuring frame, it is so arranged that the centroid of a face model would come in the center of display screen PIC.

Figure 4:
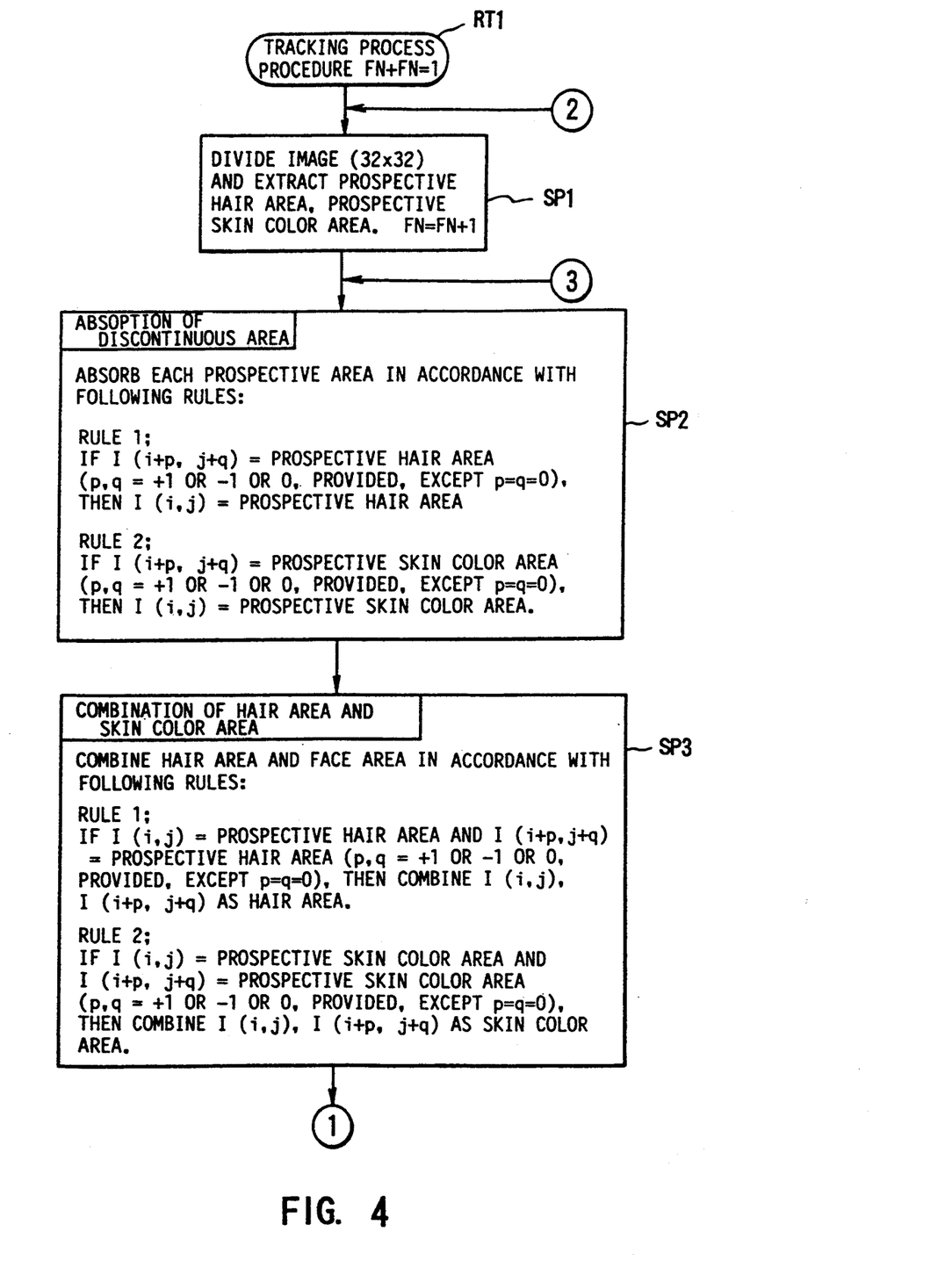
FIG. 4 is a flow chart showing the tracking process procedure.

When the tracking signal processing circuit 16 enters the tracking processing procedure RT1 of FIG. 4, first of all, it sets the field number FN to the initial value, FN=1, and moves to step SP1 and divides the display screen PIC into 32×32 divided areas AR, and then obtains counting results of the skin color pixel number counter 21 and the hair pixel number counter 22 based on said detection result of the skin color detection circuit 19 and the hair detection circuit 20 for pixels contained in each divided area AR. In utilizing these the tracking signal processing circuit 16 takes into the prospective skin color area detection information S12 when said divided area is the prospective skin color area and at the same time it takes into the prospective hair area detection information S13 when the divided area AR is the prospective hair area.

When the above procedure has been terminated at the step SP1, the tracking signal processing circuit 16 appoints the field number to be extracted and processed next time by incrementing the field number FN to FN=FN+1.

Figure 6:
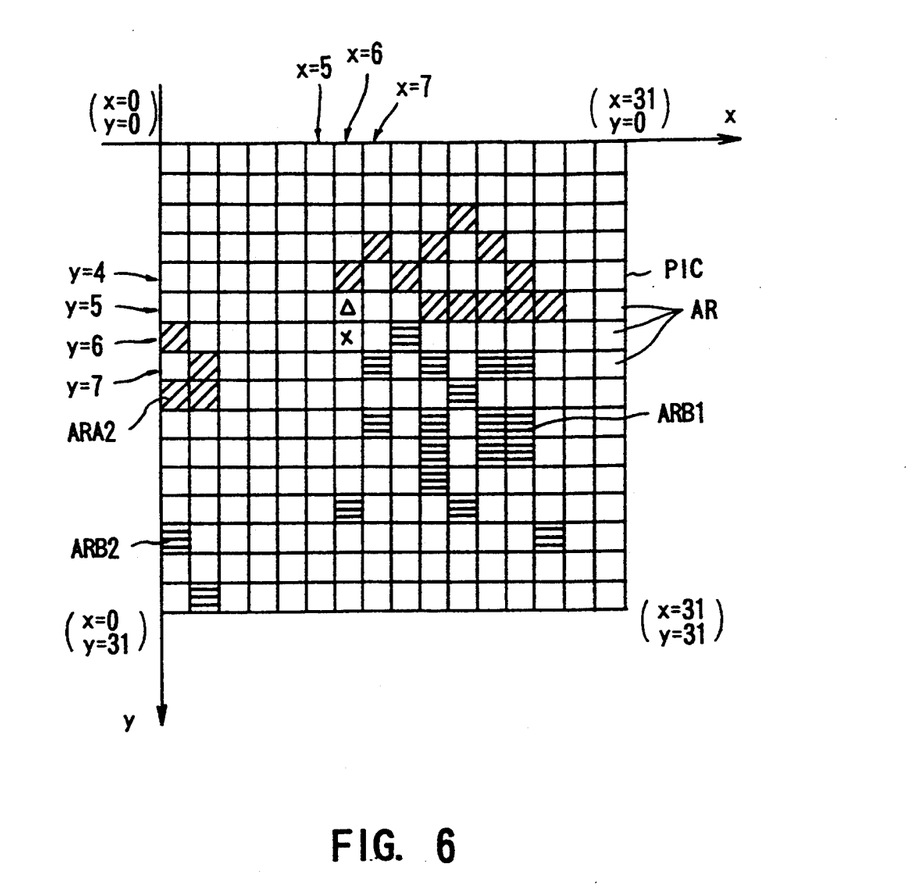
FIG. 6 is a schematic diagram showing the display screen PIC having hair areas and skin color areas detected.

With this arrangement the procedure of step SP1 has been terminated, and the tracking signal processing circuit 16 is able to obtain the distribution condition of divided areas AR judged as the prospective hair divided areas ARA and prospective skin color divided areas ARB as shown in FIG. 3 or FIG. 6.

At this point, as shown in FIG. 3, if the prospective hair divided areas ARA and the prospective skin color divided areas ARB are adjacent to each other and moreover, the extraction result shows that there is no space between the prospective hair divided areas ARA and the prospective skin color divided areas ARB is obtained, it means that the information to conform to the actual condition of human face model as an object has been obtained.

However, since in ordinary circumstances the direction and reflection manner of the light source for the object are not uniform, there occur blank areas in the prospective hair divided areas ARA and prospective skin color divided areas ARB as shown in FIG. 6, and moreover, there are many cases where extracting results show that there are blank areas in the group of prospective hair divided areas ARA and the group of prospective skin color divided areas ARB.

Then, the tracking signal processing circuit 16 absorbs said discontinuous areas according to hair area absorbing rule 1 and skin color area absorbing rule 2 at the following step SP2.

The "absorption rule 1" of discontinuous areas is "If I (i+p, j+q)=hair area, (p, q=+1 or −1 or 0, provided excepting p=q=0), then absorb I (i, 3) as the prospective hair area".

This "absorption rule 1" of discontinuous areas means that in the address (x=i, y=j) area the image information I (i, j) of said designated divided areas will be absorbed in the prospective hair divided areas ARA in the case where there are prospective hair divided areas ARA in the neighboring areas centering around this divided areas AR.

For example, in FIG. 6 in the case where the blank divided area (x=6, y=5) is designated as an appointed area, the hair divided area (x=6, y=4) is included as prospective hair divided area ARA1 in divided areas AR, i.e., (x=5, y=4), (x=6, y=4), (x=7, Y=4), (x=7, Y=5), (x=7, y=6), (x=6, y=6), (x=5, y=6) and (x=5, y=6) which surround this blank divided area, and thus this blank divided area (x=6, y=5) is absorbed in a group of prospective hair divided areas ARA1 by the "absorption rule 1".

Also, the absorption rule of discontinuous area will be applied after applying the "absorption rule 2", and its content is as follows: If I (i+p, 3+q)=prospective skin color divided area; (p, q=+1 or −1 or 0, provided, excepting p=q=0), then I (i, J) is absorbed as prospective skin color divided area.

The "absorption rule 2" of this discontinuous area is the same as described above regarding prospective hair divided area ARA. If there are prospective skin color areas in the neighbor areas concerning the designated divided area (x=i, y=j), the image information i (x=i, y=J) of said designated divided area (x=i, y=3) will be absorbed as prospective skin color divided area ARB.

The "absorption rule 2" of this discontinuous area is the same as described above regarding prospective hair divided area ARA. If there are prospective skin color areas in the neighbor areas concerning the designated divided area (x=i, y=j), the image information i (x=i, y=j) of this designated divided area (x=i, y=j) will be absorbed as prospective skin color divided area ARB.

For example, in FIG. 6 in the case where the blank divided area (x=6, y=6) is appointed as a designated area, since the skin color area (x=7, y=7) is included as prospective skin color divided area ARB1 in divided areas AR surrounding this blank divided area (x=6, Y=6), i.e., (x=5, y=5), (x=6, y= 5), (x=7, y=5), (x=7, y=6), (x=7, y=7), (x =6, y=7), (x=5, y=7) and (x=5, y=6), this blank divided area (x=6, y=6) is absorbed in a group of prospective skin color areas ARB1 by the "absorption rule 2".

Figure 7:
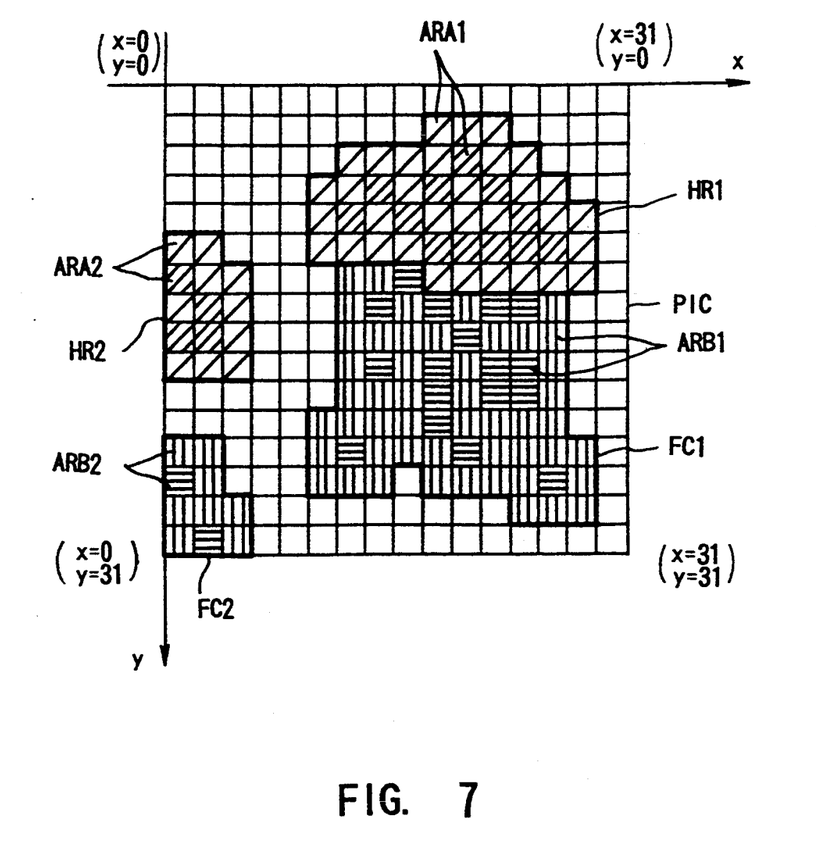
FIG. 7 is a schematic diagram showing the display screen PIC absorbed and/or combined.

Accordingly, the absorption process of discontinuous area of the step SP2 is terminated and as shown in FIG. 6, since there were blank areas in the group of prospective hair divided areas ARA1, the group of prospective hair divided areas ARA1 was discontinuous, however, this blank areas can be filled in by the absorbed prospective skin color divided area ARB2 as shown in FIG. 7.

The tracking signal processing circuit 16 proceeds to the step SP3 when the process of step SP2 is terminated and defines the determination of hair area and skin color area by the "hair area determination rule 1" and the "skin color area determination rule 2".

The "hair area determination rule 1" is If I (i, j)=prospective hair area and I (i+p, j+q)=prospective hair area, (here p, q= +1 or −1 or 0, provided, excepting p=q=0), then I (i, j), I (i+p, j+q) will be combined as hair area.

This "hair area determination rule 1" means that in the address (x=i, y=j) area, the image information (i, j) of said designated area (x=i, y=j) will be combined in the hair divided area group HR, in the case where there are prospective hair divided areas in the neighboring divided areas centering around said divided areas.

Also, the "skin color area determination rule 2" combines I (i, j), I (i+p, j+q) as skin color area, "If I (i, j) is prospective skin color area and I (i+p, j+q) is prospective skin color area, (here p, q= 1 or −1 or 0, provided, excepting p=q=0)".

This "skin color area determination rule 2" is the same as described above regarding the prospective hair divided area, the image information (x=i, y=3) and the image information of neighboring area where there exists the prospective skin color divided area group FC if there are prospective skin color areas in the neighboring areas regarding the designated divided area (x=i,y=j).

Then, for example, as described above, if the "hair area determination rule 1" is applied to the area (x=6, y=5) absorbed in the hair divided area (FIG. 6) by the "hair area absorption rule 1", hair divided areas (x=5, y=5), (x=5, y=4), (x=6, y=4), (x=7, y=4) and (x=7, y=5) are included as prospective hair divided areas in the divided areas around the divided area (x=6, y=5), i.e., (x=5, y=4), (x=6, y=4), (x=7, y=4), (x=7, y=5), (x=7, y=6), (x=6, y=6), (x=5, y=6) and (x=5, y=5), and areas (x=5, y=4), (x=6, y=4), (x=7, y =4), (x=7, x=5), (x=6, y=5) and (x=5, y=5) will be combined as the hair divided area group HRI.

Moreover, for example, as described above, if the "skin color area determination rule 2" is applied to the divided area (x=6, y=6) absorbed in the skin color divided area by the "skin color area absorption rule 2", areas (x=6, y=6), (x=7, y=6), (x=7, y=7) and (x=6, y=7) will be combined as the skin color divided area Group FC1 because skin color divided areas (x=7, y=6), (x=7, y=7) and (x=6, y=7) are included as prospective skin color areas in divided areas around the divided area (x=6, y=6), i.e., (x=5, y=5), (x=6, y=5), (x=7, y=5), (x=7, y=6), (x=7, y=7), (x=6, y=7), (x=5, y=7) and (x=5, y=6).

Thus, as shown in FIG. 7, divided area Groups HR1 and HR2 in the display screen PIC are combined as the hair area and divided area Groups FC1 and FC2 are combined as the skin color area at the steps SP2 and SP3 by absorbing discontinuous divided areas and by combining hair divided area and skin color divided area.

Figure 5:
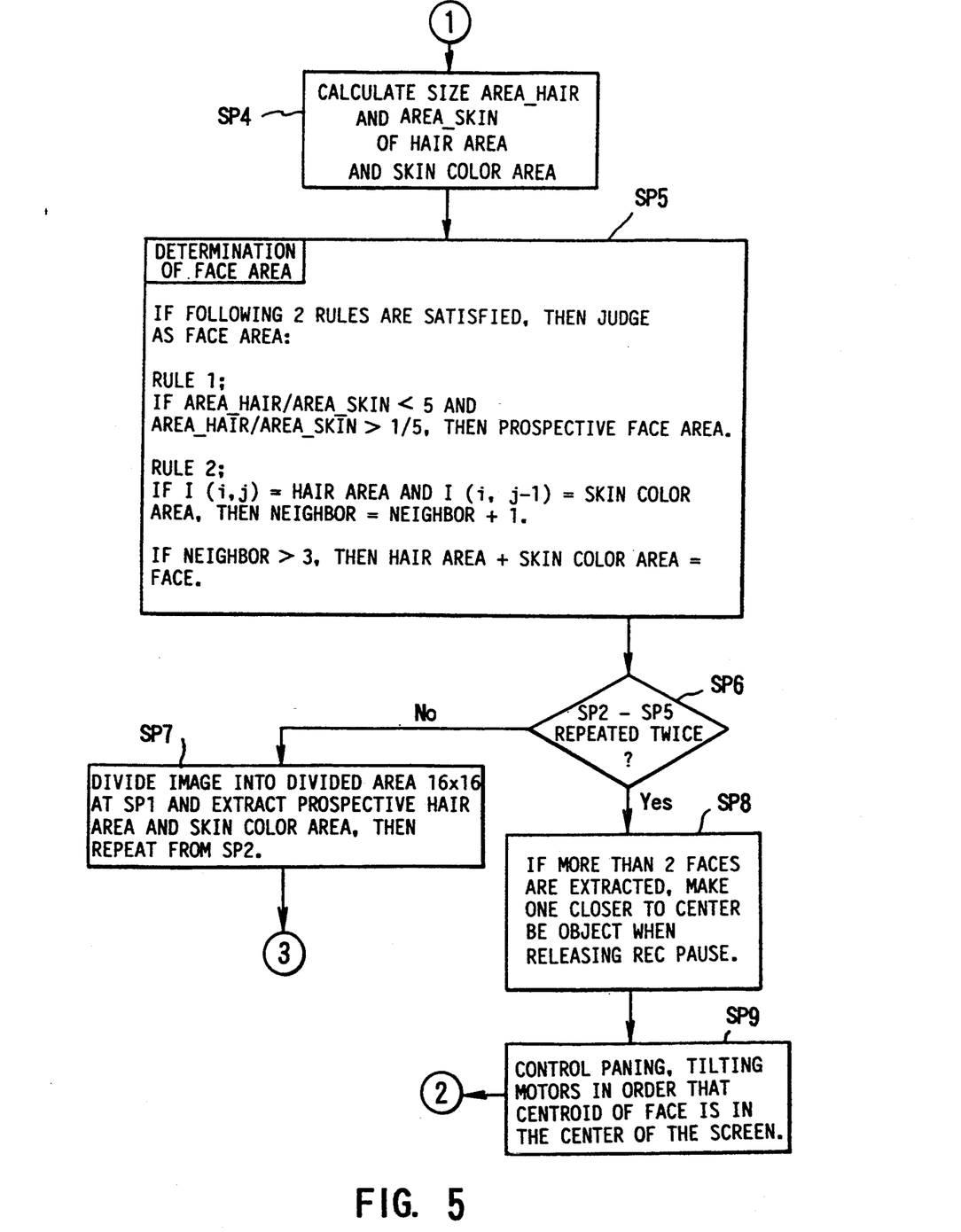
FIG. 5 is a flow chart showing the tracking process procedure continued from FIG. 4.

Then, the tracking signal processing circuit 16 proceeds to the step SP4 of FIG. 5 and calculates the sizes Area_Hair and Area_Skin of combined hair areas HR1 and HR2, and skin color areas FC1 and FC2.

In the case of display screen PIC, as shown in FIG. 7, the size Area_Hair of the hair area HR1 is calculated as the total number of areas contained in the hair area HR1, i.e. Area_Hair=45. In the same manner, the size Area_Hair of the hair area group HR2 is calculated as the Area_Hair=14, the size Area_Skin of skin color area group FC1 is calculated as Area_Skin=66 and the size Area_Skin of skin color area group FC2 is calculated as Area_Skin=10.

Then, the tracking signal processing circuit 16 proceeds to the step SP5 and judges the process to determine the face area under the condition to satisfy conditions of the "face area determination rule 1" and the "face area determination rule 2".

The "face area determination rule 1" identifies one hair divided area group and one skin color divided area group as a set of areas and if the size ratio of the size Area_Hair of the one hair area group and the size Area_Skin of one skin color area group, i.e., Area_Hair/Area_Skin<5 and Area_Hair/Area_Skin>1/5, determines as prospective face area.

This "face determination rule 1" judges that this set of divided area group is most possible the face area if the size ratio of the sizes Area_Hair and Area_Skin is less than five times and more than 1/5 times.

The above judgement avoids the possibility of misjudging that all dark areas would be judged as hair area, such as the image having numerous divided areas with dark brightness level on the display screen PIC (e.g., in the case where there is a dark screen in the back), Similarly, in the case where there exist a large quantity of skin color divided areas besides face skin, it is possible that the judgement of face area can not correctly be defined, and the above judgement of face area may not correctly be defined, and the above judgement thus avoids erroneous judgement.

Furthermore, the "face area determination rule 2" defines that "if I (i, 3)=hair area and I (i, j−1)=skin color area, Neighbor=Neighbor+1. If Neighbor> 3, then hair area+skin color area is face".

This "face area determination rule 2" judges a set of hair area group and skin color area group as the face if the upper side of the screen is hair divided area group (i.e., I (i, j)) and the lower side is skin color area group (i.e., I (i, j−1)) and under the condition that these hair divided area group and skin color divided area group are in contact with at least three divided areas.

According to this "face area determination rule 2", a pair of divided area groups, i.e., a set of hair area group HR1 and skin color area group FC1 is in contact with 8 divided areas and satisfies this rule 2, and therefore, it is judged as a face.

On the other hand, because a pair of divided area groups, i.e., a set of hair area group HR2 and skin color area group FC2 is not in contact with any areas and does not satisfy the condition of rule 2, it is excluded from the judgement of face area.

Furthermore, the tracking signal processing circuit 16 proceeds to the step SP6 and judges whether the process of steps SP2-SP5 has been repeated twice or not. When the first process is finished, it proceeds to the step SP7 and changes the divided number divided at the step SP1 from 32×32 to 16×16 and extracts prospective hair area and prospective skin color area and returns to the step SP2.

Thus, the tracking signal processing circuit 16 executes steps SP2-SP3-SP4-SP5 on the divided areas of 16×16, and thus improve the probability of face recognition by executing the process on roughly divided areas than the process on 32×32 divided.

In this connection, there are cases where the face object which could not be recognized at the time of 32×32 divided process can be recognized by processing on the roughly divided areas. For instance, it is especially successful in case of treating a zoomed large face in the display screen PIC.

When an affirmative result is obtained at the step SP6, it means that the image processing has been finished twice and the tracking signal processing circuit 16 proceeds to the step SP8 and if more than two faces are extracted from one display screen PIC, it selects the face area near the center of display screen PIC as an object at the time when the record pause button is released, and then at the step SP9, it supplies tracking control signal S5 in order that the centroid of the face will be the center of the measuring frame, i.e., the display screen PIC, to the panning driving motor 12 and the tilting driving motor 13.

Thus, the tracking signal processing circuit 16 terminates a cycle of the automatic tracking process and returns to the step SP1 mentioned above to enter the following automatic tracking cycle. With this arrangement, since the characteristic used is a hue signal which is hard to be affected by the intensity and direction of a light source and more effectively distinguishes the characteristic of the object on the display screen, an automonous target tracking apparatus which is hard to be affected by the background and the movement of the hands can be obtained.

In this connection, in the case where the characteristic quantity of the object is processed based on the brightness signal as before, if the lightness of the display screen PIC brightens up extremely or becomes dimmer, as described above regarding the HLS color coordinate system in FIG. 2, it has been difficult to grasp the image information of the object. However, in the case of the above embodiment, even through the lightness becomes extremely brighter or dimmer, the characteristic quantity of the object cannot be lost.

Also, according to the foregoing construction, since the peak value has not been used as the characteristic quantity, it is resistant to noises and since the human face model which is not affected by changes of the coordinate on the screen is used without using the motion vector, a system which less affected by the movement of a hand holding the camera will be constructed.

Furthermore, according to the foregoing construction, since it stores an image of the human face model inside, the user does not have to initialize the object and there is no need for setting up the measuring frame and if there is a background in the measuring frame, the phenomenon that a center of a picture would be pulled by this cannot occur.

Figure 8:
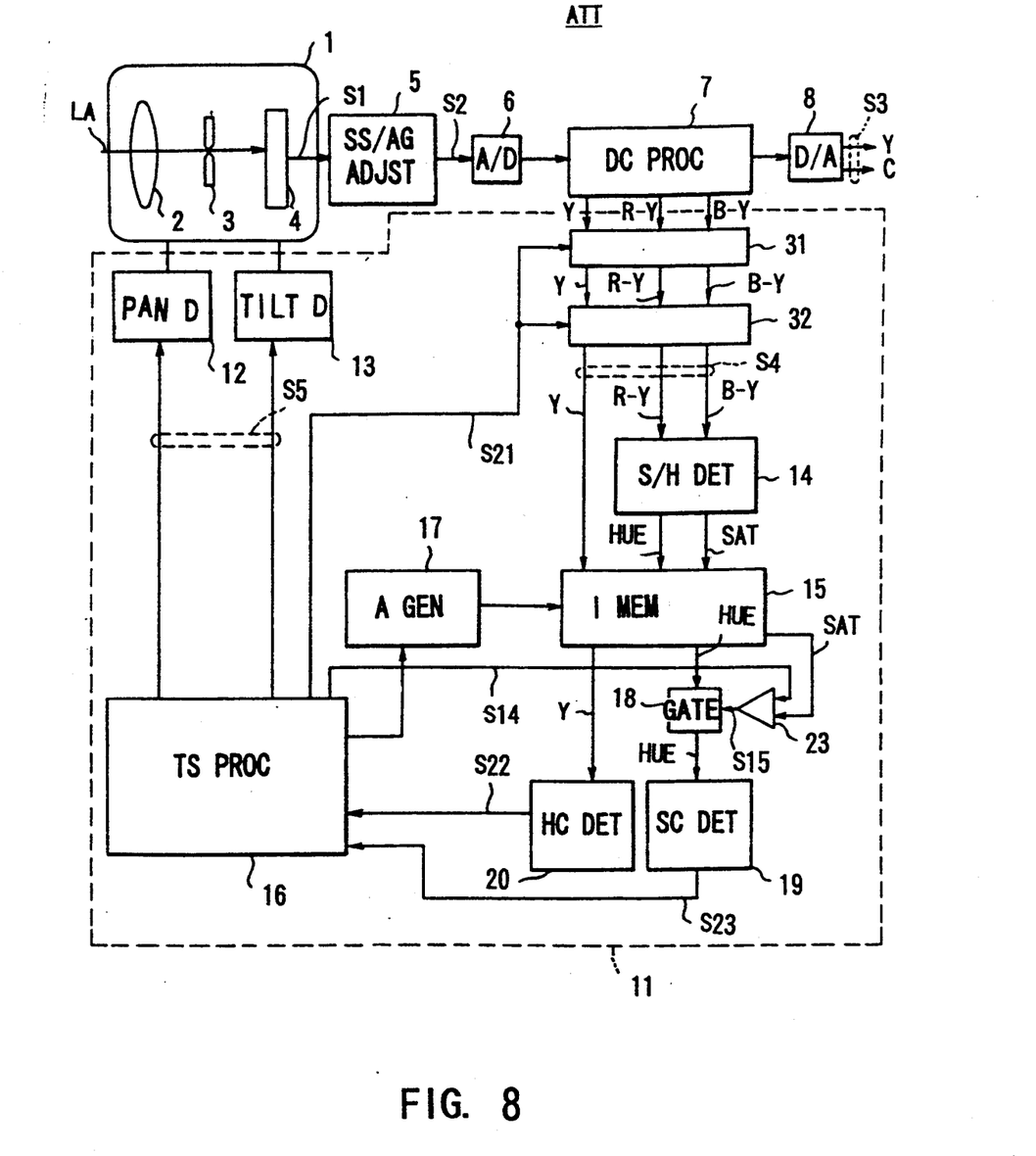
FIG. 8 is a block diagram showing a video camera target tracking apparatus according to the other embodiment of the present invention.

FIG. 8 illustrates the other embodiment according to the present invention and as shown, the identical reference numerals are assigned to corresponding parts of FIG. 1. Brightness signal Y, color difference signal R-Y and B-Y obtained from the digital camera processing circuit 7 will be given to the screen reduction circuit 32 via a low pass filter 31. The screen reduction circuit 32 divides the display screen PIC into divided areas 32×32 or 16×16 by means of screen reduction control signal S21 outputted from the tracking signal processing circuit 16 and brightness signal Y and color difference signal R-Y and B-Y of each pixel outputted from the digital camera processing circuit 7.

Accordingly, hue signal HUE and saturation signal SAT will be supplied to the image memory 15 by giving color difference signals R-Y and B-Y corresponding to 32×32 areas or 16×16 areas from the screen reduction circuit 32 to the saturation/hue detection circuit 14 as target tracking detection signal S4 and simultaneously, brightness signal Y will be supplied directly to the image memory 15 as target tracking detection signal.

In this case, the image memory 15 has a memory area for 32×32 images, therefore, in the case of FIG. 1 it is necessary to have memory capacity for one field of pixel, on the other hand in the case of FIG. 8, it can be simplified further.

With this arrangement, hue signal HUE and saturation signal SAT will be outputted as signals accumulated in 32×32 pixels or 16×16 pixels, and thus the hair detection circuit 20 and skin color detection circuit 19 detect divided areas 32×32 or 16×16 whether they are the hair areas or skin color areas respectively and supply the detection result to the tracking signal processing circuit 16 as hair area detection output S22 and skin color area detection output S23.

According to the construction of FIG. 8, since it is so arranged that the saturation/hue detection circuit 14, the image memory 15, the hair detection circuit 20 and the skin color detection circuit 19 will be processed after the image signal for one screen to be outputted from the digital camera processing circuit 7 is reduced as image information of 32×32 divided areas or 16×16 divided areas at the screen reduction circuit 19, the circuit construction of said processing circuits can be further simplified.

In the case where the autonomous target tracking apparatus ATT composed of FIG. 1 or FIG. 8 is applied to an auto focus adjusting system, since the auto focus adjusting system tracks in order that the lens block unit 1 can set the measuring frame followed by the display-screen PIC corresponding to the change of the face centroid, an automatic focus adjusting system which can focus the lens 2 on the centroid position of a face can be obtained.

Also, in the case of applying the automonous target tracking apparatus of the above mentioned construction to an automatic iris adjusting system, since it can be so arranged that the lens block unit 1 can set the measuring frame on the centroid of the face followed by the display screen PIC and the centroid of the face can be always light measured, it becomes unnecessary to correct the counter light as the auto iris adjusting system and simultaneously, the brightness level of the object can be set automatically to the optimum value.

Furthermore, in the case of applying the autonomous target tracking apparatus to an automatic white balance adjusting system, since the lens block unit 1 sets the measuring frame to track the centroid of the face followed by the display screen PIC, the auto white balance adjusting system can adjust colors of overall screen by adjusting to get optimal skin color or the face. And as a result, the auto white balance adjusting system as a whole can adjust the auto skin color balance (ASB) and thus, as compared with the conventional auto white balance adjusting apparatus which adjusts because the integrated result of the entire screen is white, even in the case where the environment of the object is over exposed or under exposed, the display screen having excellent color balance can be obtained.

Furthermore, the embodiment described above has dealt with the case of executing absorption, combination and determination processes on the group of hair divided areas and the group of skin color divided areas by setting the measuring frame on the overall display screen PIC. However, the same effects as those of the embodiment described above can be obtained if the measuring frame is set in the area selected according to demands in the display screen PIC.

Moreover, the embodiment described above has dealt with the case of shifting the field of vision of the lens block 1 corresponding to the movement of the object by panning and/or tilting and thus the desired object image will be entered in the measuring frame. However, the same effects as those of the embodiment described above can be obtained by shifting the measuring frame for the image in the display screen PIC without panning or tilting.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video camera system comprising:
   a lens block unit;
   area dividing means for dividing a display image of image output signals outputted from said lens block unit into divided areas of prescribed dimensions;
   skin color area extracting means for extracting skin color divided areas wherein values of a hue signal are within prescribed ranges corresponding to skin color;
   lightness area extracting means for extracting lightness divided areas wherein values of a brightness signal are within prescribed ranges of luminance;
   absorbing means for forming skin color divided area groups and lightness divided area groups by absorbing blank divided areas around said skin color divided areas and said lightness divided areas, respectively;
   adjacent divided area group extracting means for extracting a set of a skin color divided area group and a lightness divided area group which are adjacent to each other from said skin color divided area groups and lightness divided area groups, respectively; and
   measuring frame setting means for setting a measuring frame in order that said set of said skin color divided area group and said lightness divided area group are encompassed by said measuring frame and continuously centering said measuring frame around said set of said skin color divided area group and said lightness divided area group.

2. A video camera system of claim 1, wherein:
   said measuring frame setting means sets said measuring frame by moving said measuring frame on a display screen depending upon a result of said extracting operation by said adjacent divided area group extracting means.

3. A video camera system of claim 1, wherein:
   said measuring frame setting means includes means for setting said measuring frame by panning and/or tilting said lens block unit depending upon a result of said extracting operation by said adjacent divided area group extracting means.

4. A video camera system comprising:
   a lens block unit;
   area dividing means for dividing a display image of image output signals outputted from said lens block unit into divided areas of prescribed dimensions;
   skin color area extracting means for extracting skin color divided areas wherein values of a hue signal are within prescribed ranges corresponding to skin color;
   hair area extracting means for extracting hair divided areas wherein values of a brightness signal are within prescribed ranges corresponding to hair lightness in all of said divided areas;
   absorbing means for forming skin color divided area groups and hair divided area groups by absorbing blank divided areas around said skin color divided areas and said hair divided areas, respectively;
   adjacent divided area extracting means for extracting a set of a skin color divided area group and a hair divided area group which are adjacent to each other from said skin color divided area groups and said hair divided area groups, respectively;
   face defining means for judging whether said set of said skin color divided area group and said hair divided area group constitutes a face area on a condition that said hair divided area group is adjacent to an upper part of said skin color divided area group and said hair divided area group extracted by said adjacent divided area extracting means; and
   measuring frame setting for setting a measuring frame in order that said face area is encompassed by said measuring frame and continuously centering said measuring frame around said face area.

5. A video camera system of claim 4, wherein:
   said measuring frame setting means includes means for setting said measuring frame by panning and/or tilting said lens block unit in order that a centroid of said face area coincides with a center of said display screen.

6. A video camera system comprising:
   a lens block unit;
   area dividing means for dividing a display image of image output signals outputted from said lens block unit into divided areas of prescribed dimensions;
   skin color area extracting means for extracting skin color divided area wherein values of a hue signal are within prescribed ranges corresponding to skin color;

hair area extracting means for extracting hair divided areas wherein values of a brightness signal are within prescribed ranges corresponding to lightness of hair;

absorbing means for forming skin color divided area groups and hair divided area groups by absorbing blank divided areas around said skin color divided areas and said hair divided areas, respectively;

adjacent divided area group extracting means for extracting a set of a skin color divided area group and a hair divided area group which are adjacent to each other from said skin color divided area groups and hair divided area groups, respectively;

face defining means for judging whether said set of said hair divided area group and said skin color divided area group constitutes a face area on a condition that respective sizes of said hair divided area group and said skin color divided area group are calculated, a ratio of said sizes of said hair divided area group and said skin color divided area group is within a prescribed range, and said hair divided area group is adjacent to an upper side of said skin color divided area group; and measuring frame setting means for setting a measuring frame in order that said face area is encompassed by said measuring frame and continuously centering said measuring frame around said face area.

7. An autonomous target tracking method for autonomously tracking an object to be displayed on a display screen based on imaging output signals outputted from a lens block unit, said autonomous target tracking method comprising steps of:

dividing a display image of said image output signals into divided areas of prescribed dimensions;

extracting skin color divided areas wherein values of a hue signal are within prescribed ranges corresponding to skin color;

extracting lightness divided areas wherein values of a brightness signal are within prescribed ranges of luminance;

absorbing blank divided areas around said skin color divided areas and said lightness divided areas to form skin color divided area groups and lightness divided area groups, respectively;

extracting a set of a skin color divided area group and a lightness divided area group which are adjacent to each other from said skin color divided area groups and lightness divided area groups, respectively; and setting a measuring frame in order that said set of said skin color divided area group and said lightness divided area group can be encompassed by said measuring frame and continuously centering said measuring frame around said set of said skin color divided area group and said lightness divided area group.

8. An autonomous target tracking method for autonomously tracking an object to be displayed on a display screen based on imaging output signals outputted from a lens block unit, said autonomous target tracking method comprising steps of:

dividing a display image of said image output signals into divided areas of prescribed dimensions;

extracting skin color divided areas wherein values of a the hue signal are within prescribed ranges corresponding to skin color;

extracting hair divided areas wherein values of a brightness signal are within prescribed ranges corresponding to hair lightness;

absorbing blank divided areas around said skin color divided areas and said hair divided areas to form skin color divided area groups and hair divided area groups, respectively;

extracting a set of a skin color divided area group and a hair divided area group which are adjacent to each other from said skin color divided area groups and said hair divided area groups, respectively;

judging whether said set of said skin color divided area group and said hair divided area group constitutes a face area on a condition that said hair divided area group is adjacent to an upper part of said skin color divided area group in said set of said skin color divided area group and said hair divided area group; and setting a measuring frame in order that said face area is encompassed by said measuring frame and continuously centering said measuring frame around said face area.

9. An autonomous target tracking method for autonomously tracking an object to be displayed on a display screen based on imaging output signals outputted from a lens block unit, said autonomous target tracking method comprising steps of:

dividing a display image of said image output signals into divided areas of prescribed dimensions;

extracting skin color divided areas wherein values of a hue signal are within prescribed ranges corresponding to skin color;

extracting hair divided areas wherein values of a brightness signal are within prescribed ranges corresponding to lightness of hair;

absorbing blank divided areas around said skin color divided areas and said hair divided areas to form skin color divided area groups and hair divided area groups, respectively;

extracting a set of a skin color divided area group and a hair divided area group which are adjacent to each other from said skin color divided area groups and hair divided area groups, respectively;

judging whether said set of said hair divided area group and said skin color divided area group constitutes a face area on a condition that respective sizes of said hair divided area group and said skin color divided area group are calculated, a ratio of said sizes of said hair divided area group and said skin color divided area group is within a prescribed range, and said hair divided area group is adjacent to an upper side of said skin color divided area group; and setting a measuring frame in order that said face area can be encompassed by said measuring frame and continuously centering said measuring frame around said face area.

* * * * *

UNITED STATES PATENT AND TRADEMARK OFFICE
CERTIFICATE OF CORRECTION

PATENT NO. : 5,430,809

DATED : July 4, 1995

INVENTOR(S) : Tadafusa Tomitaka

It is certified that error appears in the above-identified patent and that said Letters Patent is hereby corrected as shown below:

```
In the Abstract, line 12, change "screen determined" to
          --screen is determined,--
Col. 1, line 31, delete "basically"
        line 61, after "color" insert --.--
        line 62, change "area" second occurrence, to --areas--
Col. 2, line 17, after "Simultaneously" insert --,--
Col. 3, line 53, change "to L axis" to --L axis,--
Col. 5, line 26, delete "to be"
Col. 6, line 40, change "(i,3)" to --(i,j)--
        line 63, change "(i,J)" to --(i,j)--
Col. 7, line 2, change "y=J" to --y=j--
        same line, change "y=3" to --y=j--
        line 47, change "q=1" to --q=+1--
        line 51, change "y=3" to --y=j--
Col. 8, line 7, change "Group" to --group--
        line 13, change "Groups" to --groups--
        line 15, change "Groups" to --groups--
        line 52, change "," to --.--
        line 60, change "(i,3)" to --(i,j)--
Col. 10, line 61, change "display-screen" to --display screen--
```

UNITED STATES PATENT AND TRADEMARK OFFICE
CERTIFICATE OF CORRECTION

PATENT NO. : 5,430,809
DATED : July 4, 1995
INVENTOR(S) : Tadafusa Tomitaka

It is certified that error appears in the above-indentified patent and that said Letters Patent is hereby corrected as shown below:

<u>In the claims:</u>

Col. 14, line 6, delete "the"

Signed and Sealed this

Twentieth Day of August, 1996

*Attest:*

BRUCE LEHMAN

*Attesting Officer*  *Commissioner of Patents and Trademarks*